(12) United States Patent
Sugihara et al.

(10) Patent No.: US 11,590,728 B2
(45) Date of Patent: Feb. 28, 2023

(54) LAMINATED PLATE AND METHOD FOR MANUFACTURING LAMINATED PLATE

(71) Applicant: SUGIHARA CO., LTD, Hiroshima (JP)

(72) Inventors: Shigeru Sugihara, Hiroshima (JP); So Fujimoto, Hiroshima (JP)

(73) Assignee: SUGIHARA CO., LTD, Hiroshima (JP)

( * ) Notice: Subject to any disclaimer, the term of this patent is extended or adjusted under 35 U.S.C. 154(b) by 26 days.

(21) Appl. No.: 17/285,965

(22) PCT Filed: Nov. 24, 2020

(86) PCT No.: PCT/JP2020/043566
§ 371 (c)(1),
(2) Date: Apr. 16, 2021

(87) PCT Pub. No.: WO2021/171716
PCT Pub. Date: Sep. 2, 2021

(65) Prior Publication Data
US 2022/0118732 A1    Apr. 21, 2022

(30) Foreign Application Priority Data

Feb. 25, 2020 (JP) .............................. JP2020-029005

(51) Int. Cl.
*B32B 3/12* (2006.01)
*B32B 37/10* (2006.01)
(Continued)

(52) U.S. Cl.
CPC ................. *B32B 3/12* (2013.01); *B32B 5/18* (2013.01); *B32B 5/245* (2013.01); *B32B 37/10* (2013.01);
(Continued)

(58) Field of Classification Search
CPC ........ B29C 66/72523; B29C 66/72525; B29C 70/48; B32B 2305/024; B32B 37/146
See application file for complete search history.

(56) References Cited

U.S. PATENT DOCUMENTS 4,964,936 A * 10/1990 Ferro ...................... B29C 44/56
264/321
5,188,879 A * 2/1993 Hill .......................... B29C 44/08
428/117

(Continued)

FOREIGN PATENT DOCUMENTS

| JP | H08-258189 A | 10/1996 |
| JP | 5624327 B2 | 11/2014 |

OTHER PUBLICATIONS

International Search Report of PCT/JP2020/043566 dated Feb. 22, 2021.

(Continued)

*Primary Examiner* — Scott W Dodds
(74) *Attorney, Agent, or Firm* — IP Business Solutions, LLC

(57) ABSTRACT

The present invention provides a laminated plate capable of not only achieving a reduced weight and an increased rigidity but also improving a sound absorbing performance, and a method for manufacturing the same. A laminated plate (1) is supposed to include a core layer (2) including a plate-shaped paper honeycomb structure (4) and a pair of fiber reinforcement layers (3) sandwiching the paper honeycomb structure (4) from both sides in a thickness direction and integrated with the paper honeycomb structure 4. The through-holes (5) of the paper honeycomb structure (4) are filled with a foam resin (6), and the core layer (2) is made up of the paper honeycomb structure 4 and the foam resin (6) filled in the through-holes (5). When the foam resin (6) is filled in the through-holes (5) of the paper honeycomb (Continued)

structure (4), the foam resin plate (6A) is pushed into the through-holes (5) as a filling material by utilizing a compression force of a mold (11).

10 Claims, 16 Drawing Sheets

(51) Int. Cl.
  B32B 5/18      (2006.01)
  B32B 5/24      (2006.01)
  B32B 37/14     (2006.01)
  B32B 38/08     (2006.01)
  B29C 65/00     (2006.01)
(52) U.S. Cl.
  CPC ............ B32B 37/14 (2013.01); B32B 37/146 (2013.01); B32B 38/08 (2013.01); B29C 66/72525 (2013.01); B32B 2250/03 (2013.01); B32B 2250/40 (2013.01); B32B 2260/023 (2013.01); B32B 2262/101 (2013.01); B32B 2266/0278 (2013.01); B32B 2305/022 (2013.01); B32B 2305/024 (2013.01); B32B 2305/18 (2013.01); B32B 2307/102 (2013.01); B32B 2309/105 (2013.01); B32B 2317/12 (2013.01); B32B 2375/00 (2013.01)

(56) References Cited

U.S. PATENT DOCUMENTS

| 5,567,499 | A | * | 10/1996 | Cundiff | B29C 70/48 428/116 |
| 2013/0234373 | A1 | * | 9/2013 | Zuardy | B29C 33/30 425/504 |
| 2017/0021596 | A1 | * | 1/2017 | Livesay | B32B 5/28 |
| 2019/0071164 | A1 | * | 3/2019 | Penn | B32B 38/0004 |

OTHER PUBLICATIONS

Written Opinion of the International Searching Authority of PCT/JP2020/043566 dated Feb. 22, 2021.

* cited by examiner

FIG. 9

| SAMPLE NO. | DENSITY (kg/m³) | PLATE THICKNESS (mm) | MAXIMUM TESTING FORCE DURING COMPRESSION (N) | COMPRESSION STRENGTH (kpa) | RESULT OF INSERTION |
|---|---|---|---|---|---|
| 1 | 29 | 4 | 72.1 | 28.8 | × |
| 2 | 35 | | 110.8 | 44.3 | ○ |
| 3 | 29 | 4.5 | 62.3 | 24.9 | × |
| 4 | 26 | | 52.8 | 21.1 | × |
| 5 | 29 | | 53.7 | 21.5 | × |
| 6 | 15 | 5 | 20 | 8.0 | × |
| 7 | 15 | | 22.6 | 9.0 | × |
| 8 | 22 | 6 | 68.9 | 27.6 | × |
| 9 | 26 | 7 | 91.5 | 36.6 | × |
| 10 | 29 | | 81.1 | 32.4 | × |
| 11 | 35 | 10 | 121.3 | 48.5 | ○ |
| 12 | 35 | 13 | 156.2 | 62.5 | ○ |
| 13 | 22 | | 99.84 | 39.9 | × |
| 14 | 22 | 15 | 95.24 | 38.1 | × |
| 15 | 35 | | 271.4 | 108.6 | ○ |
| 16 | 35 | 20 | 336.6 | 134.6 | ○ |

FIG. 10

| SAMPLE NO. | DENSITY (kg/m³) | PLATE THICKNESS (mm) | MAXIMUM TESTING FORCE (N) | TENSILE STRENGTH (kpa) | ELONGATION RATE (%) | RESULT OF INSERTION |
|---|---|---|---|---|---|---|
| 4-1 | 26 (VERTICAL) | 4.5 | 21.9 | 194.8 | 14.2 | × |
| 4-2 | 26 (LATERAL) | | 25.4 | 225.7 | 13.6 | × |
| 3-1 | 29 (VERTICAL) | | 18.5 | 164.5 | 13.8 | × |
| 3-2 | 29 (LATERAL) | | 20.3 | 180.7 | 13.8 | × |
| 2-1 | 35 (VERTICAL) | 4 | 13.9 | 123.7 | 6.5 | ○ |
| 2-2 | 35 (LATERAL) | | 15.2 | 135.2 | 7.4 | ○ |
| 1-1 | 29 (VERTICAL) | 4 | 23.1 | 231.4 | 17.7 | × |
| 1-2 | 29 (LATERAL) | | 22.1 | 220.9 | 18.9 | × |
| 6-1 | 15 (VERTICAL) | 5 | 7.3 | 58.3 | 21.4 | × |
| 6-2 | 15 (LATERAL) | | 7.0 | 55.8 | 21.9 | × |
| 8-1 | 22 (VERTICAL) | 6 | 14.7 | 97.9 | 11.3 | × |
| 8-2 | 22 (LATERAL) | | 16.4 | 109.1 | 9.2 | × |
| 9-1 | 26 (VERTICAL) | 7 | 35.9 | 205.4 | 14.6 | × |
| 9-2 | 26 (LATERAL) | | 31.3 | 179.1 | 15.9 | × |
| 10-1 | 29 (VERTICAL) | | 35.4 | 202.0 | 16.8 | × |
| 10-2 | 29 (LATERAL) | | 34.2 | 195.4 | 19.6 | × |
| 21-1 | 35 (VERTICAL) | 5 | 12.4 | 99.3 | 6.4 | ○ |
| 21-2 | 35 (LATERAL) | | 13.8 | 110.2 | 5.9 | ○ |
| 22-1 | 29 (VERTICAL) | 10 | 30.1 | 120.4 | 11.1 | ○ |
| 22-2 | 29 (LATERAL) | | 31.6 | 126.4 | 12.8 | ○ |

LAMINATED PLATE AND METHOD FOR MANUFACTURING LAMINATED PLATE

TECHNICAL FIELD

The present invention relates to a laminated plate and a method for manufacturing a laminated plate.

BACKGROUND ART

In a proposed method for manufacturing a laminated plate, as shown in Patent Document 1, a plate-shaped porous body formed to have multiple through-holes adjacent to each other is prepared as a core layer; fiber layers are arranged on both sides of the porous body in a thickness direction; after applying an uncured resin to each of the fiber layers, both fiber layers having the resin applied thereto are compressed toward the porous body; and the resin is cured under the compressed state. This method for manufacturing a laminated plate can provide a laminated plate in which both sides in the thickness direction of the core layer composed of a porous body are sandwiched and integrated by a pair of fiber reinforcement layers (cured resin contained in the fiber layers), which can achieve a performance increased in rigidity by the fiber reinforcement layer and the porous body while reducing a weight by the through-holes of the porous body.

PRIOR ART DOCUMENT

Patent Document

Patent Document 1: Japanese Patent No. 5624327

SUMMARY OF THE INVENTION

Problem to be Solved by the Invention

However, in the laminated plate, the through-holes of the porous body basically exists as spaces in the core layer, and the sound absorbing performance of the laminated plate is not necessarily high since a number of the spaces exist. Therefore, when such a laminated plate is used, desired sound insulation cannot be achieved against noise.

The present invention was conceived in view of the situations and a first object of the present invention is to provide a laminated plate capable of not only achieving a reduced weight and an increased rigidity but also improving a sound absorbing performance.

A second object is to provide a method for manufacturing a laminated plate that can easily manufacture a laminated plate capable of not only achieving a reduced weight and an increased rigidity but also improving a sound absorbing performance.

To achieve the first object, the present invention is configured as (1) and (2) below.

(1) In a laminated plate comprising: a core layer including a plate-shaped porous body formed to have multiple through-holes adjacent to each other; and a pair of fiber reinforcement layers sandwiching the porous body in the core layer from both sides of the porous body in a thickness direction and integrated with the porous body, the through-holes of the porous body are each filled with a cured foam resin between the paired fiber reinforcement layers, and the core layer is made up of the porous body and the cured foam resin filled in the through-holes in the porous body.

According to this configuration, not only the rigidity of the laminated plate can be increased by the fiber reinforcement layers and the porous body, but also a sound attenuation effect (sound absorption effect) can effectively be enhanced by filling the through-holes of the porous body with the cured foam resin to eliminate a relatively large space formed by each of the through-holes and by forming and utilizing many voids (air bubbles) present in the foam resin for absorption of energy of input sound. On the other hand, even though the through-holes of the porous body are filled with the cured foam resin, the foam resin is relatively lightweight, so that an increase in weight of the laminated plate can be suppressed as much as possible. Therefore, the laminated plate can increase the rigidity while suppressing the increase in weight as much as possible and also can improve the sound absorption performance.

(2) Under the configuration of (1), the porous body is formed as a honeycomb structure, foamed polyurethane is filled as the cured foam resin in the through-holes of the porous body, the pair of fiber reinforcement layers includes a cured resin and fibers contained in the cured resin, and the cured resin in the pair of fiber reinforcement layers and the foamed polyurethane in the through-holes in the porous body are bonded and integrated.

According to this configuration, foamed polyurethane is filled in the through-holes of the porous body having a honeycomb structure, and the fiber reinforcement layers having a cured resin and fibers are used to specifically implement the effect of (1) described above.

To achieve the second object, the present invention is configured as (3) to (20) below.

(3) A method of manufacturing a laminated plate, including preparing a honeycomb structure as a plate-shaped porous body formed to have multiple through-holes adjacent to each other, arranging fiber layers on both sides of the porous body in a thickness direction, supplying an uncured resin to each of the fiber layers from the outer side of the fiber layer, and then compressing both of the fiber layers supplied with the resin toward the honeycomb structure and curing the resin under the compressed state to form fiber reinforcement layers on both sides of the honeycomb structure in the thickness direction, wherein as the fiber layers are arranged on both sides of the honeycomb structure in the thickness direction, a foam resin plate cured and having a lower compression strength than the compression strength of the honeycomb structure is interposed between the fiber layer on at least one side of the fiber layers and the honeycomb structure, and wherein as both of the fiber layers are compressed toward the honeycomb structure, a compression force is used to push the foam resin plate into the through-holes of the honeycomb structure as a filling material.

According to this configuration, the through-holes of the honeycomb structure are each filled with the foam resin between the paired fiber reinforcement layers, so that the laminated plate can be manufactured such that the core layer is made up of the honeycomb structure and the cured foam resin filled in the through-holes. Moreover, in this case, the easy-to-handle foam resin plate is used when the cured foam resin is filled into the through-holes, and furthermore, a compression force at the time of compression of the fiber layers toward the honeycomb structure is utilized to push the foam resin plate into the through-holes of the honeycomb structure as a filling material, so that the laminated plate can easily be manufactured. Furthermore, as the fiber layers are arranged on both sides of the honeycomb structure in the thickness direction, a foam resin plate cured and having a lower compression strength than the compression strength of the honeycomb structure is interposed between the fiber layer on at least one side of the fiber layers and the honeycomb structure, and therefore, the uncured resin supplied to the fiber layer on at least one side is reliably retained by the foam resin plate so that a predetermined amount of the uncured resin can accurately be contained in the fiber layer. As a result, at least one fiber reinforcement layer arranged (formed) on the honeycomb structure can be made in accordance with specifications, and the amount of the foam resin plate pushed into the through-holes of the honeycomb structure can be made accurate by adjusting the thickness thereof. Additionally, the uncured resin supplied to the fiber layer on at least one side of the fiber layers and the foam resin plate can be brought into sufficient contact with each other in this case, so that the at least one fiber reinforcement layer arranged (formed) on the honeycomb structure can accurately be integrated with the honeycomb structure at the next process (process of pushing the foam resin plate into the through-holes of the honeycomb structure) even without specially performing an adhesive application work etc.

(4) Under the configuration of (3), the foam resin plate has a compression strength of the foam resin plate smaller than the compression strength of the honeycomb structure and equal to or greater than a predetermined compression strength smaller than the compression strength of the honeycomb structure and has an elongation rate per unit thickness of the foam resin plate equal to or less than a predetermined value.

According to this configuration, based on the idea of the present inventor that the compression strength and the elongation rate of the foam resin plate are related to the quality of insertion of the foam resin plate into the honeycomb structure, when the laminated plate is manufactured, the foam resin plate can reliably be pushed into the through-holes of the honeycomb structure as a filling material by simply using the foam resin plate satisfying the conditions based on the findings obtained by the present inventor, so that the laminated plate can easily be manufactured.

(5) Under the configuration of (4), in determining the predetermined value for the elongation rate per unit thickness of the foam resin plate, by utilizing good and bad results of insertion of the foam resin plate into the honeycomb structure based on the plate thickness and the elongation rate of the foam resin plate, a boundary line for dividing the good and bad results of insertion of the foam resin plate into the honeycomb structure is created on coordinates using the plate thickness and the elongation rate of the foam resin plate as coordinate axes, so as to obtain a gradient of the boundary line.

According to this configuration, since the boundary line is created by utilizing the actual thickness and elongation rate of the foam resin plate, and the good and bad results of insertion of the foam resin plate into the honeycomb structure based thereon, an accurate value can be obtained as the predetermined value (upper limit value of the elongation rate per unit thickness of the foam resin plate) based on the real situation.

(6) Under any of the configurations (3) to (5), a plurality of types of foam resin plates different in degree of foaming is prepared for the foam resin plate, and a foam resin plate to be used is selected from the plurality of types of foam resin plates at the time of manufacturing.

According to this configuration, a user can appropriately select the foam resin plate from the viewpoint of sound absorption characteristics and can manufacture a preferable laminated plate depending on the intended use in terms of sound absorption characteristics. Specifically, the sound absorption characteristics tend to be higher as the degree of foaming of the foam resin plate becomes higher and to be lower as the degree of foaming of the foam resin plate becomes lower, and therefore, a laminated plate having desired sound absorbing characteristics can quickly be manufactured by grasping this tendency corresponding to the degree of foaming of the foam resin plate, preparing a plurality of types of foam resin plates different in degree of foaming, and selecting from these plates.

(7) Under any of the configurations (3) to (6), the foam resin plate is a plate-shaped foamed polyurethane, and the resin applied to the fiber layers is a polyurethane-forming mixture.

According to this configuration, the characteristics and properties of polyurethane can be reflected in the laminated plate to utilize the characteristics and properties of polyurethane in the laminated plate.

(8) A method of manufacturing a laminated plate, including preparing a plate-shaped porous body formed to have multiple through-holes adjacent to each other, arranging fiber layers on both sides of the porous body in a thickness direction, applying an uncured resin to each of one and the other fiber layers, and then compressing both of the fiber layers having the resin applied thereto toward the porous body and curing the resin under the compressed state, wherein an uncured foam resin is used as the uncured resin, wherein regarding a permeability of the other fiber layer for the uncured foam resin, the permeability of the other fiber layer is higher than the permeability of the one fiber layer, wherein the fiber layers are brought into a posture in which the other fiber layer faces upward, and wherein the uncured foam resin is applied to the other fiber layer to supply the uncured foam resin through the other fiber layer into the through-holes of the porous body.

According to this configuration, the uncured liquid foam resin is supplied to the through-holes of the porous body through the other fiber layer, the uncured liquid foam resin can be prevented from leaking to the outside by utilizing the hardly-permeable property of the one fiber layer, and the uncured liquid foam resin can be retained in the through-holes of the porous body and foamed and cured. Obviously, in this case, not only the other fiber layer but also the one fiber layer is impregnated with the uncured foam resin, and the one fiber layer and the other fiber layer are each formed as the fiber reinforcement layer due to the foaming and curing of the uncured foam resin. Therefore, unlike the case that the foam resin plate is filled as a filling material into the through-holes of the porous body, the cured foam resin can accurately be filled in the through-holes of the porous body without considering a relative relationship between the porous body and the foam resin plate, the performance of the foam resin plate, etc., so that the laminated plate can easily be manufactured.

(9) Under the configuration of (8), by simply applying the uncured foam resin to the other fiber layer, the uncured foam resin is applied also to the one fiber layer through the other fiber layer and the through-holes of the porous body.

According to this configuration, the one fiber layer can be impregnated with the uncured foam resin while maintaining the posture in which the other fiber sheet on the porous body faces upward from the beginning, so that the necessity to change (invert) the posture of the porous body etc. can be eliminated. As a result, a workload can be reduced.

(10) Under the configuration of (8), before achieving a posture in which the other fiber layer faces upward and applying the uncured foam resin to the other fiber layer, the uncured foam resin is applied to the one fiber layer to impregnate the one fiber layer with the uncured foam resin.

According to this configuration, not only the one fiber layer and the other fiber layer are each formed as the fiber reinforcement layer due to the foaming and curing of the uncured foam resin, but also the uncured liquid foam resin is supplied to the through-holes of the porous body through the other fiber layer, the uncured liquid foam resin can be prevented from leaking to the outside by utilizing the hardly-permeable property of the one fiber layer and the uncured foam resin contained in and having adhered to the one fiber layer, and the uncured liquid foam resin can reliably be retained in the through-holes of the porous body and foamed and cured. Therefore, also in this case, unlike the case that the foam resin plate is filled as a filling material into the through-holes of the porous body, the cured foam resin can accurately be filled in the through-holes of the porous body without considering a relative relationship between the porous body and the foam resin plate, the performance of the foam resin plate, etc., so that the laminated plate can easily be manufactured.

(11) Under the configuration of (10), the one fiber layer is arranged on one side of the porous body in the thickness direction to supply the uncured foam resin to the one fiber layer, and wherein the porous body and the one fiber layer are then inverted so that the other fiber layer is arranged on the other side of the porous body in the thickness direction to supply the uncured foam resin to the other fiber layer.

According to this configuration, even if each of the fiber layers is arranged on the porous body immediately before the uncured foam resin is supplied to each of the one fiber layer and the other fiber layer, the same effect as the case of (10) above can be obtained.

(12) Under any of the configurations of (8) to (11), the porous body is formed as a honeycomb structure.

According to this configuration, in the laminated plate, the honeycomb structure can be used to increase the strength, and the through-holes in the honeycomb structure can effectively be used for filling the foam resin, so that the characteristics of the cured foam resin can accurately be reflected in the laminated plate.

(13) Under any of the configurations of (1) to (7) and (12), the honeycomb structure is a paper honeycomb structure made of a paper material.

According to this configuration, even when a paper honeycomb structure made of a paper material is used as the honeycomb structure, the same effect as the case of the configurations of (1) to (7) and (12) described above can be obtained.

Effect of the Invention

The present invention can provide a laminated plate capable of increasing a rigidity while suppressing an increase in weight as much as possible, and also capable of improving a sound absorption performance, and a method for manufacturing the laminated plate.

BRIEF DESCRIPTION OF DRAWINGS

FIG. 9 is a diagram showing compression strength of various test pieces (foam resin plates) and determination results of insertion into a paper honeycomb structure for the foam resin plates from which the various test pieces were taken out.

FIG. 10 is a diagram showing an elongation rate of various test pieces (foam resin plates) and determination results of insertion into a paper honeycomb structure for the foam resin plates from which the various test pieces were taken out.

MODES FOR CARRYING OUT THE INVENTION

Embodiments of the present invention will now be described with reference to the drawings.

Figure 1:
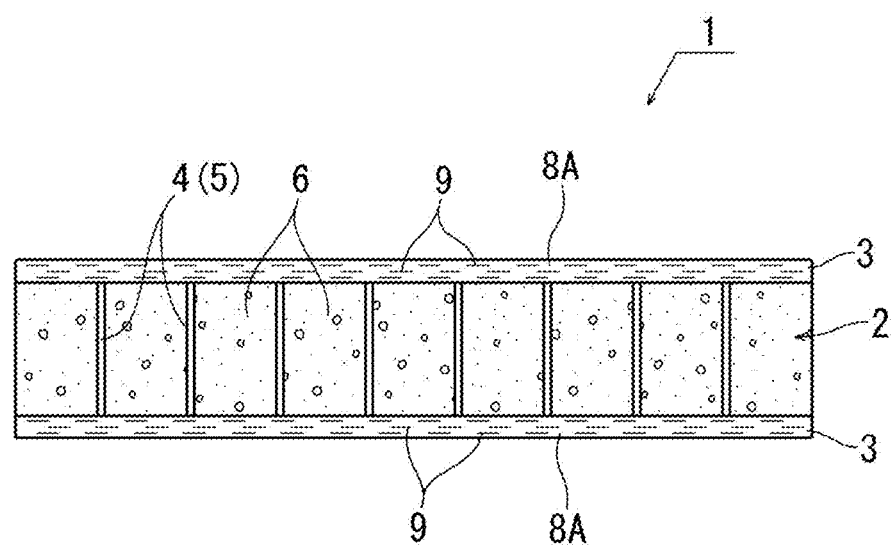
FIG. 1 is an explanatory view schematically showing a laminated plate according to a first embodiment.
Figure 2:
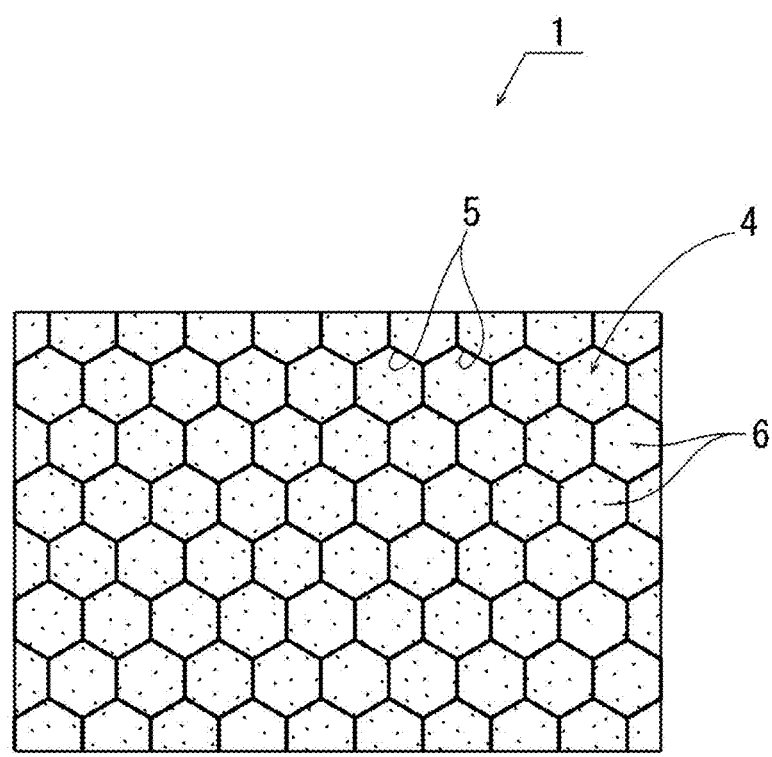
FIG. 2 is an explanatory view showing the laminated plate according to the first embodiment in a planar manner with a fiber reinforcement layer removed.

In FIGS. 1 and 2, reference numeral 1 denotes a laminated plate according to a first embodiment. The laminated plate 1 includes a core layer 2 and a pair of fiber reinforcement layers 3 integrally sandwiching both sides of the core layer 2 in a thickness direction.

The core layer 2 is composed of a porous body 4 and a cured foam resin 6 filled in through-holes 5 of the porous body 4. The porous body 4 is formed in a plate shape while maintaining a constant thickness under a honeycomb structure, and the through-holes 5 in the porous body 4 have openings formed into, for example, a regular hexagon, and each penetrate the porous body 4 in the thickness direction. The material of the porous body 4 can be a paper material (kraft paper, core base paper, etc.), plastic, metal, etc. can appropriately be used, and in this embodiment, the porous body 4 is formed as a so-called paper honeycomb structure using a paper material. The porous body 4 will hereinafter be described by using a paper honeycomb structure (hereinafter, reference numeral 4 is used). The paper honeycomb structure 4 has a thickness of a predetermined value in a range of, for example, about 5 mm to 30 mm, a foil thickness of the material thereof of 0.1 mm to 0.12 mm, and an equivalent through-hole diameter (cell size) of 4 mm to 50 mm (preferably 6 mm to 25 mm), and a compression strength in the thickness direction (compression strength at the time of 10% deformation from the original plate thickness) of about 65 kPa (cell size defined as equivalent through-hole diameter of about 25 mm, plate thickness of about 5 mm) to about 400 kPa (cell size defined as equivalent through-hole diameter of about 6 mm, plate thickness of about 20 mm). The paper honeycomb structure 4 plays a role of increasing the rigidity of the laminated plate 1 by the rigidity based on the honeycomb structure and providing a space in each of the through-holes 5 as a filling space for filling the foam resin 6.

The cured foam resin 6 is filled in the through-holes 5 of the paper honeycomb structure 4. This is to fill a relatively large space in each of the through-holes 5 and to enhance a sound attenuation effect (sound absorption effect) to improve a sound insulation function of the laminated plate 1 by utilizing voids based on bubbles inside the foam resin 6. For the foam resin 6, any resin can be used as long as the resin has voids inside based on foam (bubbles), and in this embodiment, foamed polyurethane is used as the foam resin 6. Degrees of foaming of the foamed polyurethane are prepared within a predetermined range, and an appropriate degree is selected from among them based on a relationship with the purpose of use of the laminated plate.

The pair of the fiber reinforcement layers 3 covers both sides of the core layer 2 in the thickness direction and plays a role of increasing the rigidity of the laminated plate 1 together with the core layer 2 (the porous body 4). A surface of each of the fiber reinforcement layers 3 is formed as a flat surface, and a skin material such as a non-woven fabric is bonded to the surface of each of the fiber reinforcement layers 3 by using an adhesive as needed. The pair of the fiber reinforcement layers 3 is composed of a cured thermosetting resin 8A and fibers 9 contained in the cured thermosetting resin 8A. In this embodiment, a urethane resin (foamed urethane resin) is used as the cured thermosetting resin 8A, and the urethane resin is produced by chemically reacting a polyol component and a polyisocyanate component, for example. The thermosetting resin 8A is to be bonded to the cured foam resin 6 (foamed polyurethane) in the core layer 2 and to the paper honeycomb structure 4, so that the fiber reinforcement layers 3 and the core layer 2 are integrated.

Glass fibers are used as the fibers 9. The fibers 9 are present in the cured thermosetting resin 8A and play a role of increasing the rigidity thereof.

In this laminated plate 1, not only the rigidity of the laminated plate 1 can be increased by the fiber reinforcement layers 3 and the paper honeycomb structure 4, but also a sound attenuation effect (sound absorption effect) can be enhanced by filling the relatively large space in each of the through-holes 5 in the paper honeycomb structure 4 with the cured foam resin 6 to improve blocking properties and effectively utilizing many voids (air bubbles) inside the foam resin 6 for absorption of energy of input sound. Moreover, in this case, since the through-holes 5 of the paper honeycomb structure 4 are filled particularly with foamed polyurethane serving as the foam resin 6, the characteristics of the foamed polyurethane can be reflected in the laminated plate 1. As a result, the laminated plate 1 is preferably used as a rear package tray, a rear seat back board, a rear trunk board, etc.

Figure 3:
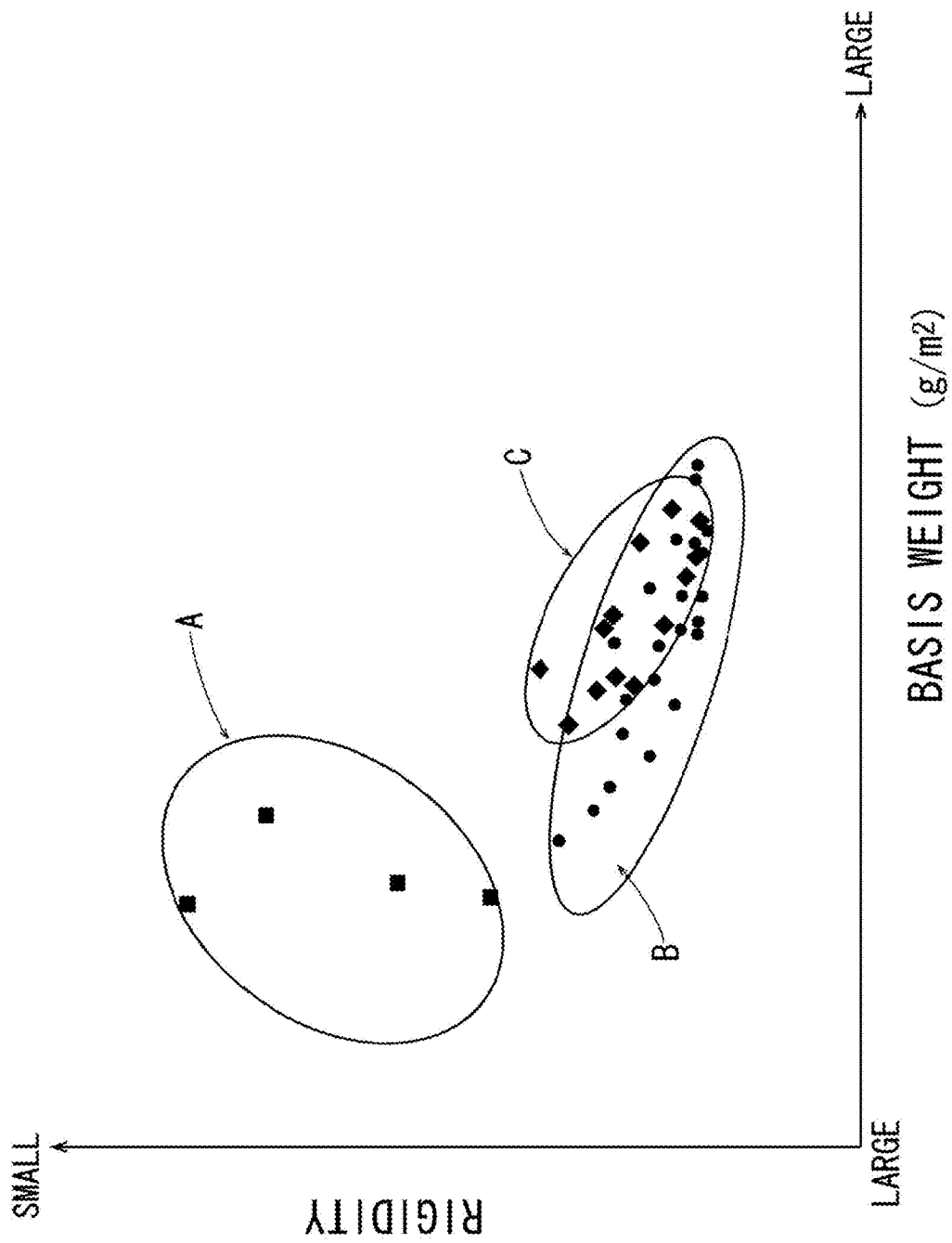
FIG. 3 is a diagram showing an experimental result of examination of a relationship between rigidity and basis weight ($g/m^2$) for a laminated plate when various core layers are sandwiched on both sides in the thickness direction by a pair of fiber reinforcement layers.

FIG. 3 is an experimental result showing a relationship between rigidity and basis weight ($g/m^2$) for the laminated plate 1 when various core layers 2 are sandwiched on both sides in the thickness direction by a pair of the fiber reinforcement layers 3. In the experiment, common experimental conditions were used for the thickness of the core layer 2 and the conditions of the pair of the fiber reinforcement layers 3, and only the configuration of the core layer 2 was made different. Regarding determination of a magnitude of rigidity, a displacement amount was measured when 200 N was applied to the laminated plate 1, and it was determined that the rigidity is higher when the displacement amount is smaller. The basis weight ($g/m^2$) indicates the weight of the core layer per unit area. In the experimental example, when the paper honeycomb structure 4 is used as a constituent element of the core layer 2, the number of the through-holes 5 per unit area of the paper honeycomb structure 4 is reflected in the basis weight, and as the number of the through-holes 5 per unit area increases (meshes become finer), the basis weight increases.

According to the experimental results shown in FIG. 3, a certain tendency was shown for each of the various core layers 2. In FIG. 3, Groups A to C are collections of experimental values corresponding to the configuration of the core layer 2; in Group A, a polyurethane layer was used as the core layer 2; in Group B, the paper honeycomb structure 4 (cell size 6 mm, plate thickness 18 mm) was used as the core layer 2; and in Group C, the foam resin 6 was filled in the through-holes 5 in the paper honeycomb structure 4 (used for Group B). In Groups A to C as described above, Groups B and C were higher in rigidity than Group A, and Groups B and C showed almost the same level of high rigidity. Regarding the weight of the core layer 2 (the laminated plate 1), Group A had the lightest weight, while Groups B and C had the weight somewhat heavier than Group A. Although Group C tended to be slightly heavier than Group B, the difference was not significant. This is probably because even though the through-holes 5 of the paper honeycomb structure 4 are filled with the cured foam resin 6, the foam resin 6 is relatively lightweight.

Figure 4:
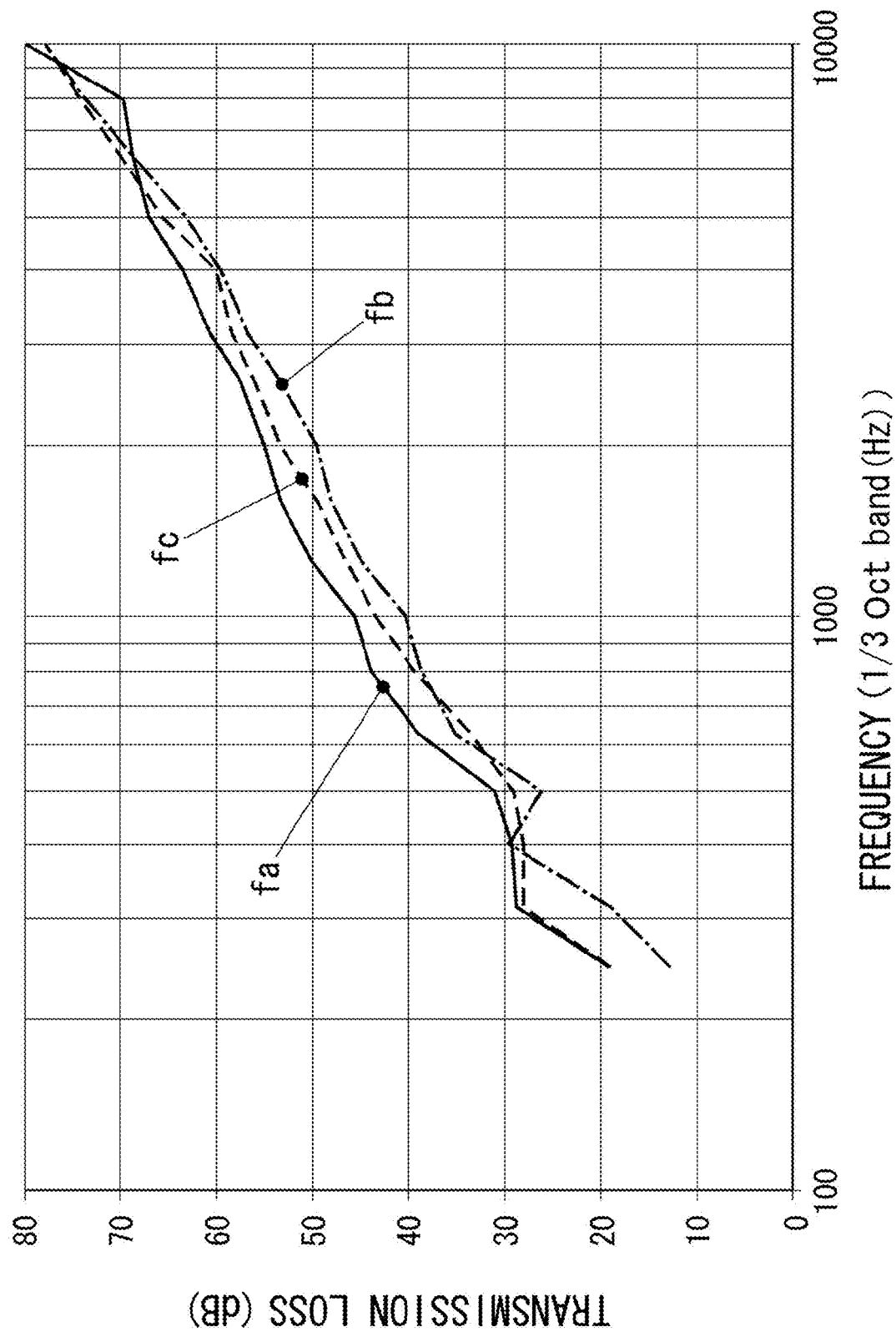
FIG. 4 is a diagram showing an experimental result of examination of a relationship between sound transmission loss and frequency for a laminated plate when various core layers are sandwiched on both sides in the thickness direction by a pair of fiber reinforcement layers.
Figure 5:
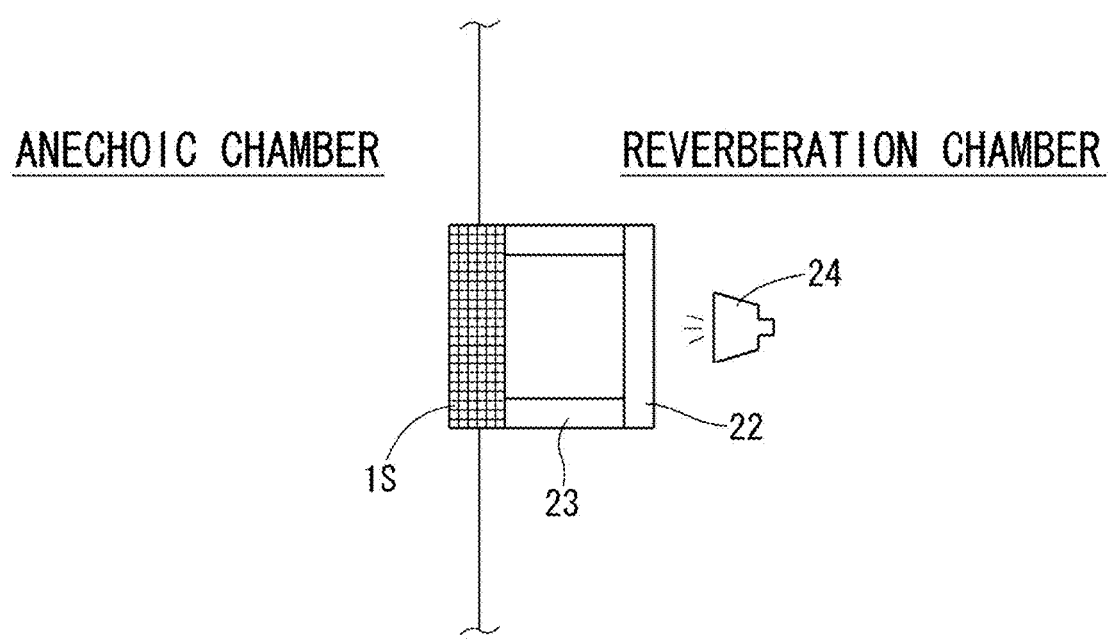
FIG. 5 is a diagram showing details of a sound transmission loss test in a simplified manner.

FIG. 4 is an experimental result showing an acoustic performance of the laminated plate 1 when the various core layers 2 are sandwiched on both sides in the thickness direction by a pair of the fiber reinforcement layers 3. In the experiment, a sound transmission loss test was performed under experimental conditions shown in FIG. 5 (test method: JIS A 1416). Specifically, a test piece 1S (thickness: 15 mm, area: 500 mm×500 mm, basis weight (weight per unit area): 3150 g/m$^2$) constituting the various core layers 2 is set between a reverberation chamber and an anechoic chamber; a spacer 23 is disposed in a projecting state on a peripheral edge portion of a surface of the test piece 1S on the reverberation chamber side to ensure a distance of 50 mm; and a leading end opening of the spacer 23 is covered with an iron plate (thickness: 0.6 mm) 22. Subsequently, sound is generated from a speaker 24 in the reverberation chamber, and an input power to the test piece 1S and a transmitted power from a surface of the test piece 1S facing the anechoic chamber are measured to calculate a sound transmission loss from the area of the test piece 1S. The test pieces 1S of the various laminated plates were test pieces using a polyurethane layer as the core layer 2, the paper honeycomb structure 4 as the core layer 2, and the cured foam resin 6 filled in the through-holes 5 in the paper honeycomb structure 4 as the core layer 2.

According to the experimental result shown in FIG. 4, among the test pieces 1S of the various laminated plates, the test piece using a polyurethane layer as the core layer 2 showed a characteristic line fa having a largest transmission loss (a largest sound insulation performance effect), and the test piece using the paper honeycomb structure 4 as the core layer 2 showed a characteristic line fb having a smallest transmission loss (a smallest sound insulation performance effect). The test piece using the cured foam resin 6 filled in the through-holes 5 in the paper honeycomb structure 4 as the core layer 2 showed a characteristic line fc having an intermediate value between the characteristic lines fa and fb.

A method of manufacturing the laminated plate 1 will be described with reference to a process diagram shown in FIG. 6.

Figure 6:
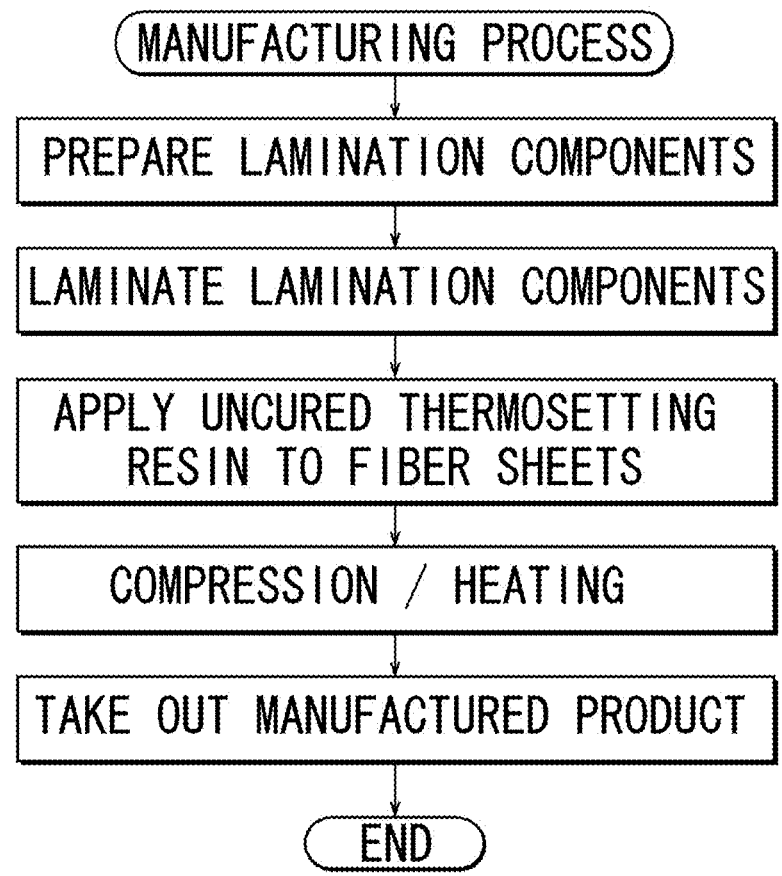
FIG. 6 is a process diagram for explaining a manufacturing process according to the first embodiment.

First, as shown in FIG. 6, lamination components of the laminated plate 1 are prepared. Specifically, the prepared components are the paper honeycomb structure 4 serving as a constituent component of the core layer 2, a foam resin plate 6A serving as the cured foam resin filled in the through-holes 5 of the paper honeycomb structure 4 as a constituent component of the core layer 2, fiber sheets 7 forming fiber layers, and an uncured liquid thermosetting resin (polyurethane-forming mixture) 8B (see FIG. 7).

For the paper honeycomb structure 4, the plate-shaped paper honeycomb structure 4 described above is used. The structure of the paper honeycomb structure 4 is as described above and, in this embodiment, the structure used has the cell size defined as equivalent through-hole diameter of 6 mm, the plate thickness of 18 mm, and the compression strength (compression strength at the time of 10% deformation from the original plate thickness) of 371.1 kPa.

The foam resin plate 6A having a predetermined thickness is prepared from the viewpoint of ease of handling and workability. In this embodiment, a foamed polyurethane resin plate is used from the viewpoint of compatibility with an adhesive, and the porosity (degree of foaming) thereof is within a predetermined range from the viewpoint of ensuring a predetermined sound absorption performance. To fill the through-holes 5 of the paper honeycomb structure 4, the foam resin plate 6A is formed into a predetermined thickness corresponding to an equivalent amount thereof and has the compression strength (kPa) and the elongation rate per unit thickness (%/mm) set to a predetermined value.

For the fiber sheets 7, sheets formed by entwining fibers (e.g., a chopped strand mat) are used. The thickness of the fiber sheets 7 is preferably about 0.1 mm to 0.3 mm.

For the uncured thermosetting resin 8B, a polyurethane-forming mixture (urethane resin) is used in this embodiment. Specifically, a liquid mixture of a polyol component, a polyisocyanate component, etc. is used.

Figure 7:
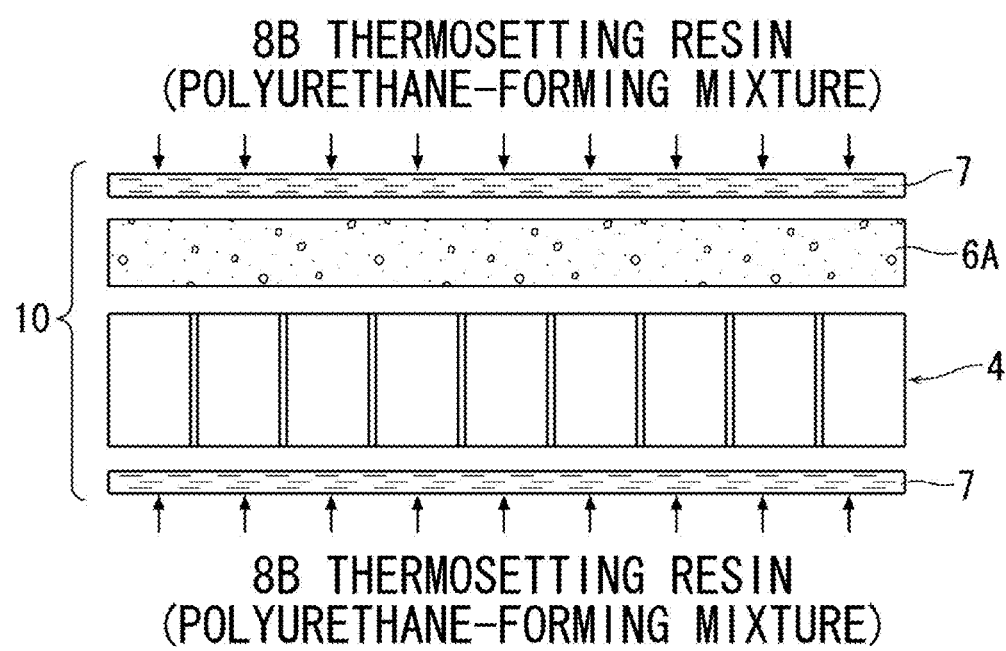
FIG. 7 is an explanatory view for schematically explaining processes of preparing lamination components, laminating the lamination components, and applying an uncured thermosetting resin to a fiber sheet.

Subsequently, as shown in FIG. 6, the lamination components 4, 6A, 7 are laminated to form a laminated body 10. When the lamination components 4, 6A, 7 are laminated, as shown in FIG. 7, one of the fiber sheets 7 is arranged on one side in the thickness direction of the paper honeycomb structure 4, and the foam resin plate 6A and the other fiber sheet 7 are arranged on the other side in the thickness direction of the paper honeycomb structure 4 in this order in the direction away from the paper honeycomb structure 4. A robot (hand) is used for the laminating work of the lamination components 4, 6A, 7, and the robot sequentially laminates the lamination components 4, 6A, 7.

Subsequently, as shown in FIG. 6, the uncured liquid thermosetting resin 8B is applied (supplied) to each of the fiber sheets 7 located on both outer surfaces of the laminated body 10. This is to impregnate the fiber sheets 7 with the liquid thermosetting resin 8B so as to form the fiber reinforcement layer 3 and to bond the fiber reinforcement layer 3 to the core layer 2. Therefore, when the liquid thermosetting resin 8B is applied to the fiber sheets 7, application, spraying, etc. of the liquid thermosetting resin 8B is performed. In this case, when applying the liquid thermosetting resin 8B to the laminated body 10, the robot conveys the laminated body 10 to a resin applying device (spraying device) while gripping the laminated body 10, and the resin applying device applies the liquid thermosetting resin to both surfaces in the wall thickness direction of the laminated body 10.

Figure 8:
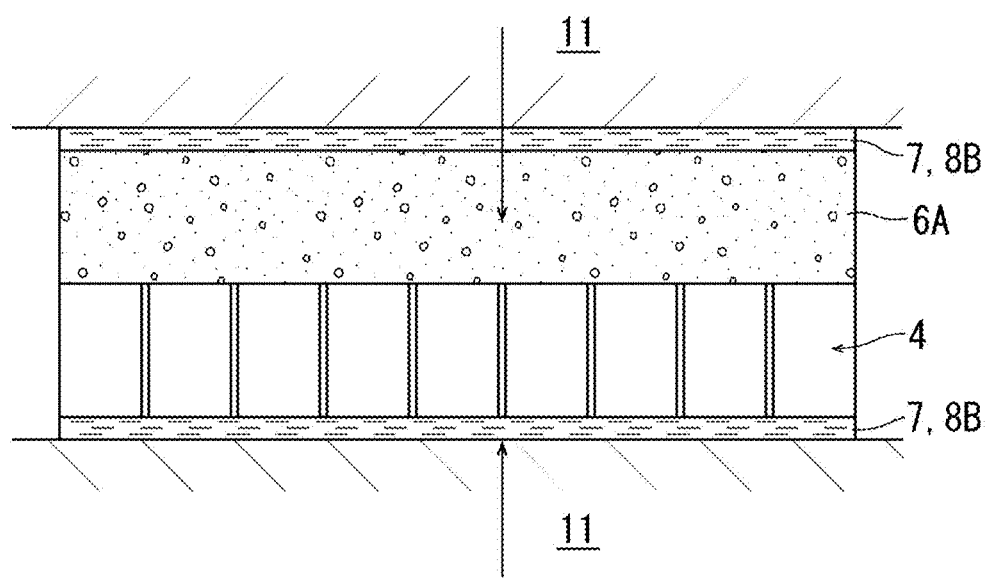
FIG. 8 is an explanatory view schematically explaining a compression/heating process using a mold after laminating lamination components.

Subsequently, as shown in FIGS. 6 and 8, the laminated body 10 having the uncured liquid thermosetting resin applied thereto is carried into a mold 11, and the laminated body 10 is compressed while being heated. By promoting the impregnation of the fiber sheets 7 with the liquid thermosetting resin 8B and curing the thermosetting resin 8B, the fiber reinforcement layers 3 (with the fibers 9 of the fiber sheets 7 contained in the cured resin) are formed on both outer sides in the thickness direction of the laminated body 10, and each of the fiber reinforcement layers 3 is bonded to the foam resin plate 6A or the paper honeycomb structure 4. Furthermore, by using a compression force in this case as a pushing force of the foam resin plate 6A against the paper honeycomb structure 4, the foam resin plate 6A is used as a filling material to fill the through-holes 5 of the paper honeycomb structure 4.

In this case, the plate used as the foam resin plate 6A has the compression strength made smaller than the compression strength of the paper honeycomb structure 4 and larger than a predetermined compression strength smaller than the compression strength of the paper honeycomb structure 4 (equal to or greater than a predetermined compression strength). This is to prevent the paper honeycomb structure 4 from being crushed when the foam resin plate 6A is placed and compressed on the paper honeycomb structure 4, while preventing the foam resin plate 6A from being excessively crushed. More specifically, this is to consider the case that when the foam resin plate 6A is compressed toward the paper honeycomb structure 4, the foam resin plate 6A cannot enter the through-holes 5 of the paper honeycomb structure 4 due to rapid movement and bulging of a substantial part (material) of the foam resin plate 6A into portions of the foam resin plate 6A facing the through-holes 5 of the paper honeycomb structure 4. Therefore, in this embodiment, the predetermined compression strength is set to 44.3 kPa, and the plate used as the foam resin plate 6A has the compression strength smaller than the compression strength (371.1 kPa)

of the paper honeycomb structure 4 described above and equal to or greater than the predetermined compression strength (44.3 kPa).

In this case, the elongation rate per unit thickness (%/mm) of the foam resin plate 6A is also taken into consideration. This is to make the foam resin plate 6A as easy to tear as possible so that the plate can easily be inserted into the through-holes 5 of the paper honeycomb structure 4. Therefore, a plate having an elongation rate per unit thickness equal to or smaller than a predetermined value is selected as the foam resin plate 6A, and in this embodiment, the predetermined value is set to 0.9 (%/mm). Obviously, in this case, the elongation rate per unit thickness of the foam resin plate 6A smaller than the predetermined value is more preferably; however, it is a prerequisite that the foam resin plate 6A can be handled as a product or a member, so that a lower limit value is set in consideration of this fact.

Additionally, in this case, the laminated body 10 is carried into the mold 11 by the robot continuously from the previous process (the process in which the resin applying device applies the uncured liquid thermosetting resin to both surfaces in the wall thickness direction of the laminated body 10). The compression of the laminated body 10 by the mold 11 is performed in the direction of pressing the two fiber sheets 7 against the paper honeycomb structure 4, and the compression force in this is set in consideration of the conditions of the paper honeycomb structure 4 and the foam resin plate 6A such that the foam resin plate 6A is pushed into the through-holes 5 of the paper honeycomb structure 4 as a filling material. The heating by the mold 11 (heater) is set in consideration of the curing temperature and the curing time of the uncured thermosetting resin 8B applied to the fiber sheets 7. The laminated plate 1 is manufactured by this series of treatments in the mold.

Subsequently, as shown in FIG. 6, the manufactured laminated plate 1 is taken out from the mold 11, and the manufacturing process is completed.

Therefore, according to this manufacturing method, the foam resin 6 is filled entirely in each of the through-holes 5 of the paper honeycomb structure 4, and the laminated plate 1 is manufactured such that the core layer 2 is made up of the paper honeycomb structure (porous body) 4 and the foam resin 6 filling the through-holes 5 thereof. Moreover, in this case, by utilizing the compression force when the fiber sheets 7 are compressed toward the paper honeycomb structure 4, the foam resin plate 6A can accurately be pushed into the through-holes 5 of the paper honeycomb structure 4 as a filling material, so that the laminated plate 1 can easily be manufactured.

EXAMPLE

To confirm the pushing (insertion) of the foam resin plate 6A into the through-holes 5 of the paper honeycomb structure 4, an experiment was conducted on the compression strength and the elongation rate (elongation rate per unit thickness) of the foam resin plate 6A.

(1) Compression Strength

Compression strength of test pieces of various foam resin plates (foamed polyurethane resin plates) was measured. In the test, based on JIS standard (JIS K 7220; 2006), various test pieces of 50 mm×50 mm were compressed at a test speed of 1 mm/min to measure a load at the time of 10% deformation from an original plate thickness. A foam resin plate used as a material for taking out each of the various test pieces is placed on the paper honeycomb structure 4 and pressed, and it was determined whether the foam resin plate is inserted (filled) as a filling material in the through-holes 5 of the paper honeycomb structure 4. In this test, the structure used as the paper honeycomb structure 4 had a cell size defined as equivalent through-hole diameter of 6 mm, a plate thickness of 18 mm, and a compression strength (compression strength at the time of 10% deformation from the original plate thickness) of 371.1 kPa, and the pressing force on the foam resin plate was 1000 N.

FIG. 9 shows the measurement results and insertion determination results. According to the results of FIG. 9, the compression strengths of the various test pieces are all smaller than the compression strength of the paper honeycomb structure 4, and most of the foam resin plates having the compression strength equal to or greater than a predetermined compression strength (44.3 kPa in this experimental result) were inserted as a filling material into the through-holes 5 of the paper honeycomb structure 4, and the foam resin plates having the compression strengths of the foam resin plates not reaching the predetermined compression strength (44.3 kPa) could not properly be inserted as a filling material into the through-holes 5 of the paper honeycomb structure 4. From the above, it is considered that the compression strength of the foam resin plate needs to be made smaller than the compression strength of the paper honeycomb structure 4 so as not to crush the paper honeycomb structure 4 when the foam resin plate is compressed toward the paper honeycomb structure 4, while the compression strength of the foam resin plate needs to be made equal to or greater than the predetermined compression strength (44.3 kPa in the experiment results) so as to prevent increase in difficulty (resistance) of the foam resin plate to enter the through-holes 5 in the paper honeycomb structure 4 due to excessive deformation of the foam resin plate.

(2) Elongation Rate (Elongation Rate per Unit Thickness)

Elongation rates of test pieces of various foam resin plates (foamed polyurethane resin plates) were measured. In the test, based on the JIS standard (JIS K 6400-5; 2012), various test pieces were pulled at a tension rate of 5 mm/min, and the elongation rate was determined based on the measured values measured in this way. In this case, at the time of the test of the various test pieces, an average value of test results of the three same test pieces was obtained as the test result of the various test pieces. When the various test pieces are the same as the test pieces used in FIG. 9, a first numeric character of "Sample No." of FIG. 10 showing the test results is the same as the numeric character of the "sample No." shown in FIG. 9. When the various test pieces are taken out from the foam resin plates, test pieces having elongation directions made different by 90 degrees (longitudinal and lateral directions of the foam resin plate) were prepared from the same foam resin plate (having the same density); these test pieces of the respective directions are separately denoted as "(longitudinal)" and "(lateral)" in the density column of FIG. 10 described later although the density (value) is the same; and this is indicated in "sample No." so that the test piece of the "(longitudinal)" direction has a numeric character "-1" following the first numeric character, and the test piece of the "(lateral)" direction has a numeric character "-2" following the first numeric character.

Figure 11:
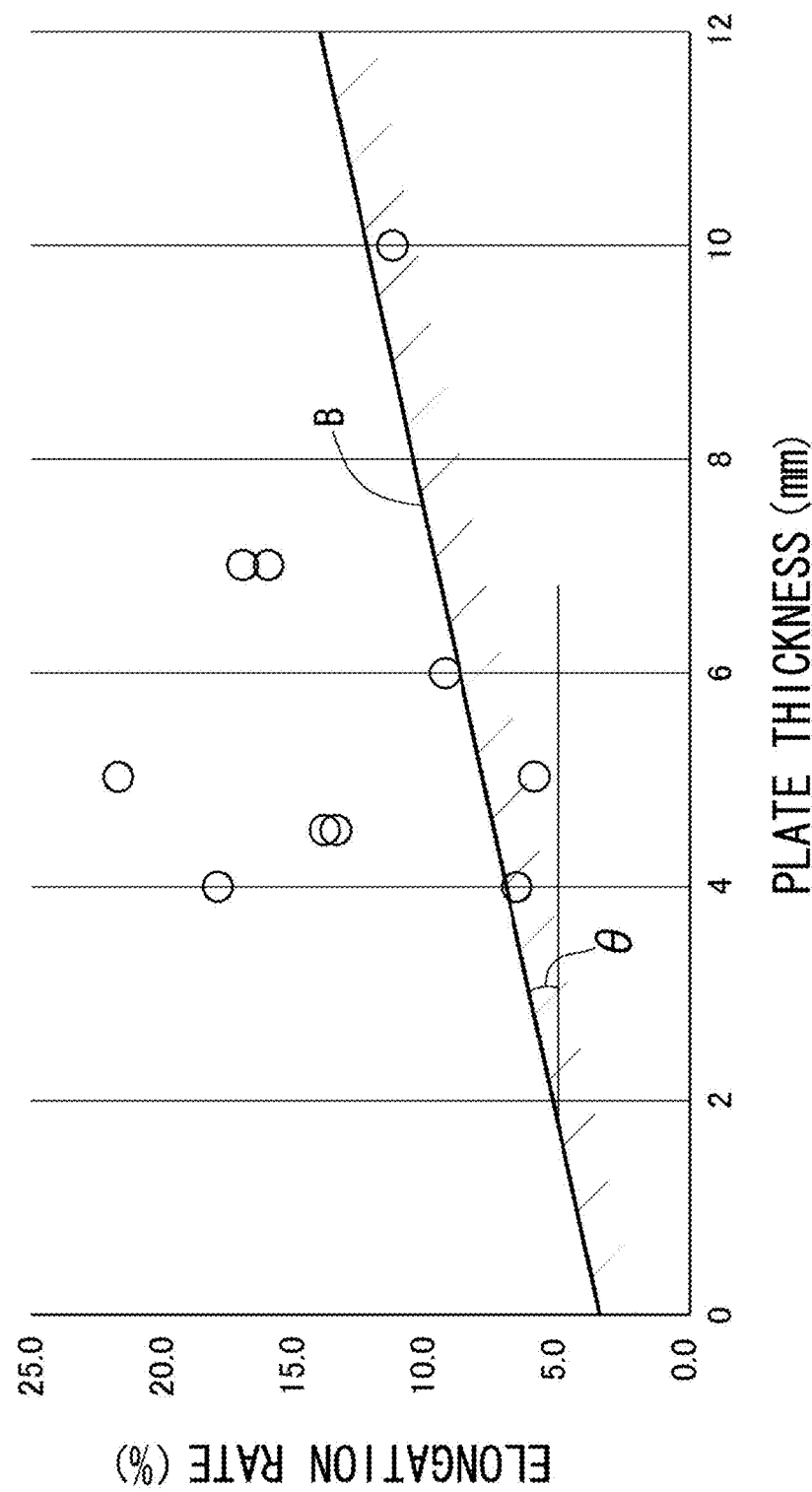
FIG. 11 is an explanatory view for explaining a method of obtaining an elongation rate per unit thickness as a predetermined value based on the elongation rate and the plate thickness of various test pieces (foam resin plates) obtained from FIG. 10.

FIG. 10 shows the elongation rate (%) and the insertion determination result for various test pieces, and FIG. 11 shows the various test pieces plotted in terms of the relationship between the elongation rate (%) and the plate thickness of the test pieces. According to FIGS. 10 and 11, although the test pieces having good insertion determination results (indicated by "o" in FIG. 10) tended to have the elongation rate increasing as the plate thickness of the test piece increases, the elongation rate was relatively small in all cases, and in FIG. 11, plots of the good insertion determination results tended to line up in a straight line. Therefore, in FIG. 11, a boundary line B was drawn by utilizing the tendency of the plots of the good insertion determination results, the elongation rate per unit thickness was obtained as a predetermined value from a gradient θ of the boundary line B, and the predetermined value was set as a required upper limit value of easiness of tearing (lower limit value of tear resistance). On the other hand, the test pieces having poor insertion determination results of the foam resin plate (indicated by "x" in FIG. 10) indicated the elongation rates higher than the boundary line B, and it was confirmed that when the elongation rate of the foam resin plate is small, the foam resin plate is easily torn off and easily inserted into the through-holes 5 of the paper honeycomb structure 4. Obviously, in this case, as long as the foam resin plate is handled as a product or a member, an elongation rate and an elongation rate per unit thickness (lower limit value) satisfying the requirements are at least required as described above.

From the gradient θ of the boundary line B of this experiment shown in FIG. 11, the elongation rate per unit thickness can be read as 0.9 (%/mm). Therefore, from the viewpoint of easiness of tearing of the foam resin plate 6A, it is probably necessary to set the elongation rate per unit thickness of the foam resin plate 6A to 0.9 (%/mm) or less.

Figure 12:
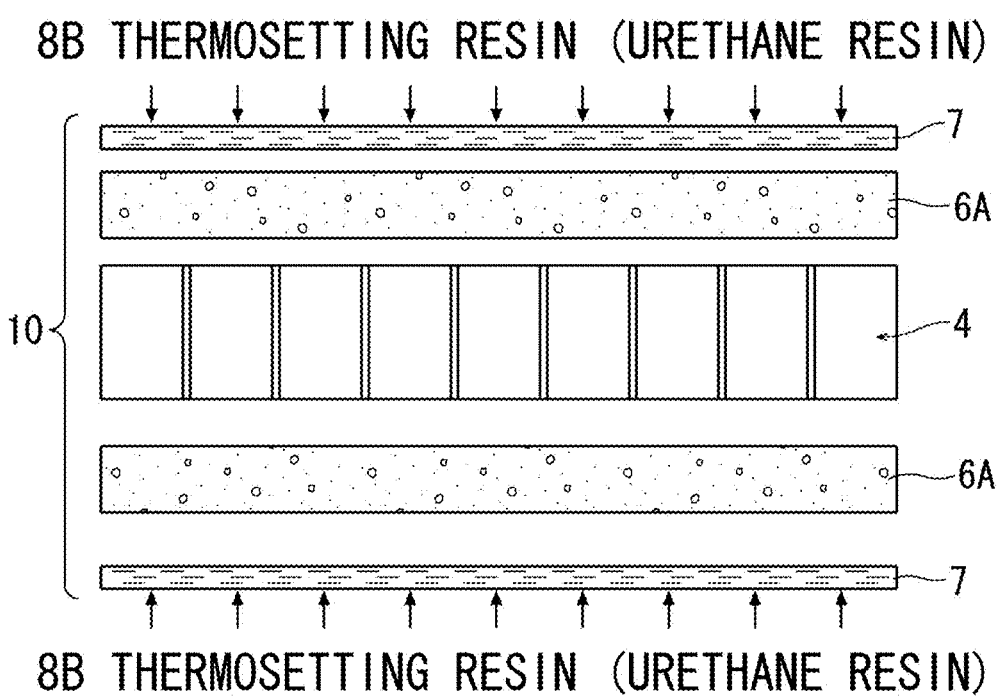
FIG. 12 is an explanatory view for schematically explaining a manufacturing method according to a second embodiment.
Figure 17:
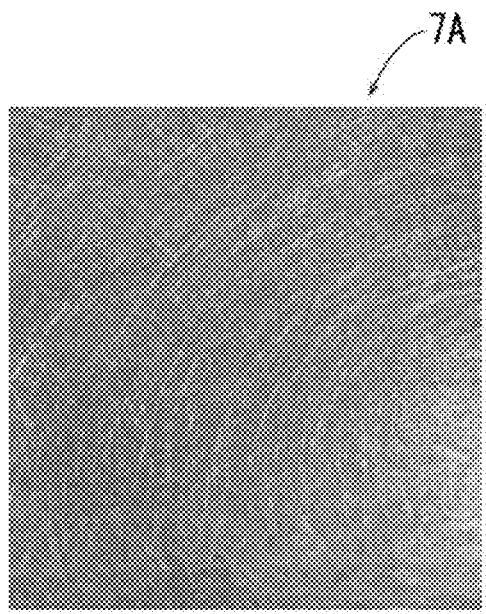
FIG. 17 is an enlarged photographic view of one of the fiber sheets (magnification: equal magnification).
Figure 18:
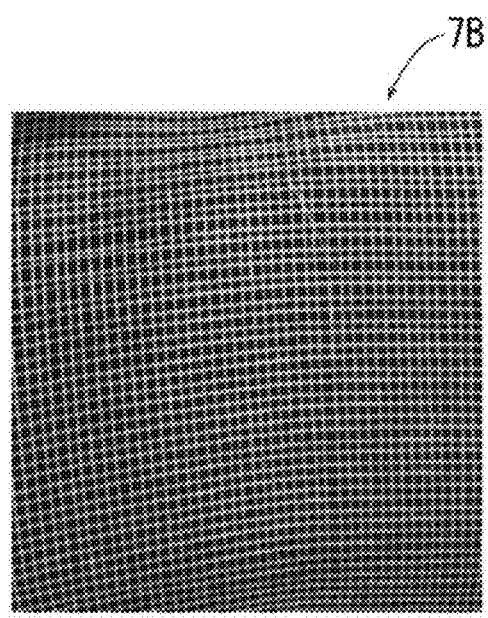
FIG. 18 is an enlarged photographic view of the other fiber sheet (magnification: equal magnification).
Figure 19:
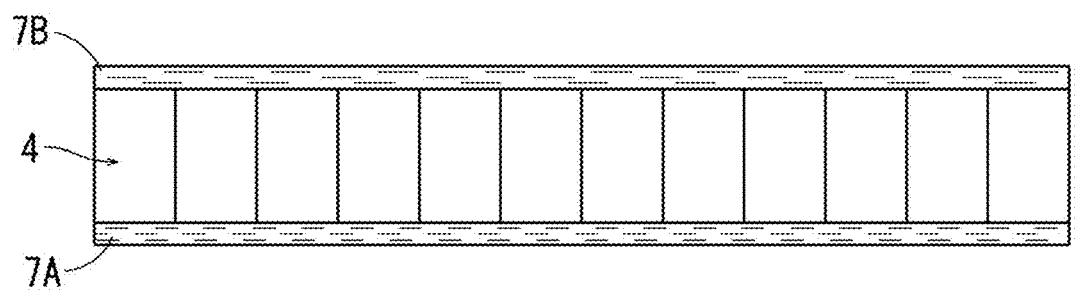
FIG. 19 is an explanatory view for schematically explaining a laminated state of lamination components according to a fourth embodiment.
Figure 20:
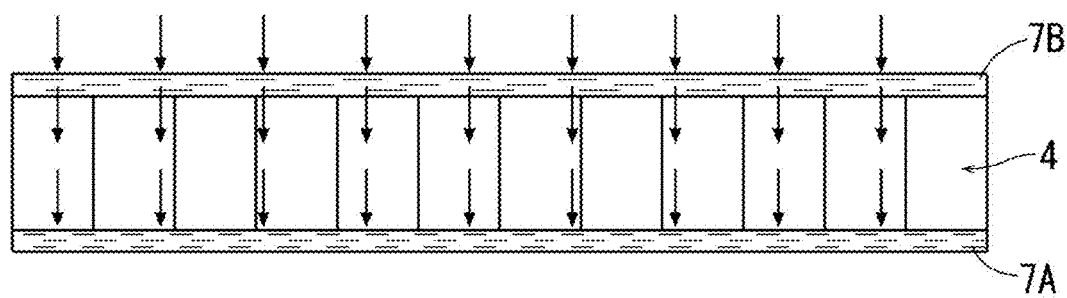
FIG. 20 is an explanatory view for schematically explaining a process of applying a liquid (uncured) foam resin to the other fiber sheet in the fourth embodiment.

FIG. 12 shows a second embodiment, FIGS. 13 to 18 show a third embodiment, and FIGS. 19 and 20 show a fourth embodiment. In the second to fourth embodiments, the same constituent elements as the first embodiment are denoted by the same reference numerals and will not be described.

In the second embodiment shown in FIG. 12, when the foam resin plates 6A are laminated to the paper honeycomb structure 4 in the manufacturing process, the foam resin plates 6A are arranged on both sides of the paper honeycomb structure 4 in the thickness direction. Therefore, when the laminated body 10 is compressed by the mold, the foam resin plates 6A can be put into the through-holes 5 from both sides in the thickness direction of the paper honeycomb structure 4, so that when the through-holes 5 are filled with the foam resin 6, the filling process can accurately be performed. Obviously, in this case, the thickness of the foam resin plates 6A is set from the viewpoint of entirely filling the through-holes 5 in the paper honeycomb structure 4 with the foam resin 6.

The third embodiment shown in FIGS. 13 to 18 shows a modification of the manufacturing method for manufacturing the laminated plate 1 according to the first embodiment. In the third embodiment, by utilizing one fiber sheet 7A and the other fiber sheet 7B different in permeability, an uncured liquid foam resin is applied (supplied) to the through-holes 5 of the paper honeycomb structure 4 and retained therein, and the foam resin is foamed in the through-holes 5 of the paper honeycomb structure 4. Specifically, this will be described with reference to a process diagram shown in FIG. 13.

Figure 13:
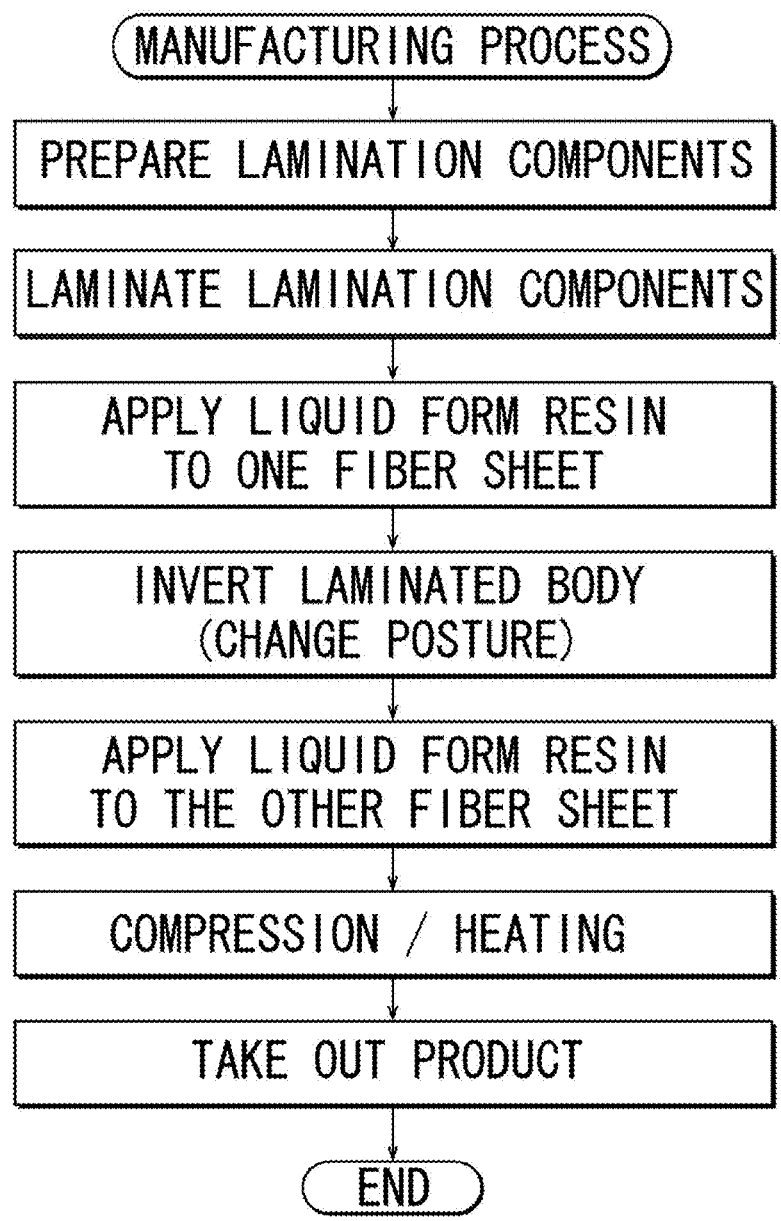
FIG. 13 is a process diagram for explaining a manufacturing process according to a third embodiment.
Figure 14:
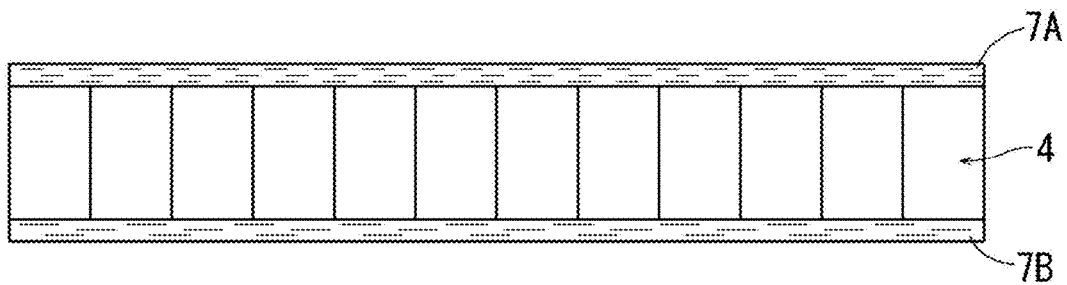
FIG. 14 is an explanatory view for schematically explaining processes of preparing lamination components and laminating the lamination components in the third embodiment.

First, as shown in FIG. 13, when the lamination components of the laminated plate 1 are prepared as the paper honeycomb structure 4 serving as a constituent component of the core layer 2, the one fiber sheet 7A constituting one fiber layer, the other fiber sheet 7B constituting the other fiber layer, and an uncured liquid foam resin 8C serving as the resin for forming the fiber reinforcement layer 3 and as the cured foam resin 6 (see FIG. 14).

For the paper honeycomb structure 4, the same structure as the first embodiment is used. Obviously, the paper honeycomb structure 4 other than the paper honeycomb structure 4 is also usable.

For the uncured liquid foam resin 8C, in this embodiment, the foaming urethane resin (polyurethane-forming mixture) 8B contained in the fiber sheet 7 and then cured to form the fiber reinforcement layer 3 in the first embodiment is used, and as described later, this foaming urethane resin not only forms the fiber reinforcement layer 3 in cooperation with the fiber sheet 7A (7B) but also is filled in the through-holes 5 of the paper honeycomb structure 4 to form the cured foam resin 6 therein.

For the one fiber sheet 7A, a chopped strand mat is used as in the first embodiment. As shown in FIG. 17, the one fiber sheet 7A has permeability for the liquid foam resin 8C described above to the extent that the liquid foam resin 8C can be contained, and the one fiber sheet 7A has limited permeability (is hardly permeable) for the liquid foam resin 8C. For the other fiber sheet 7B, a glass cloth as shown in FIG. 18 is used. The other fiber sheet 7B has a higher permeability for the liquid foam resin 8C than the one fiber sheet 7A, so that the liquid foam resin 8C can easily pass through the other fiber sheet 7B.

As shown in FIGS. 13 and 14, the lamination components 7B, 4, 7A are laminated to form the laminated body 10. When the lamination components 7B, 4, 7A are laminated, the one fiber sheet 7A is arranged on one side in the thickness direction of the paper honeycomb structure 4, and the other fiber sheet 7B is arranged on the other side in the thickness direction of the paper honeycomb structure 4. In this case, the laminated body 10 is in a posture in which the one fiber sheet 7A is arranged above the other fiber sheet 7B. A robot (hand) is used for the laminating work of the lamination components 7B, 4, 7A as in the first embodiment, and the robot sequentially laminates the lamination components 7B, 4, 7A and grips the laminated lamination components 7B, 4, 7A.

Figure 15:
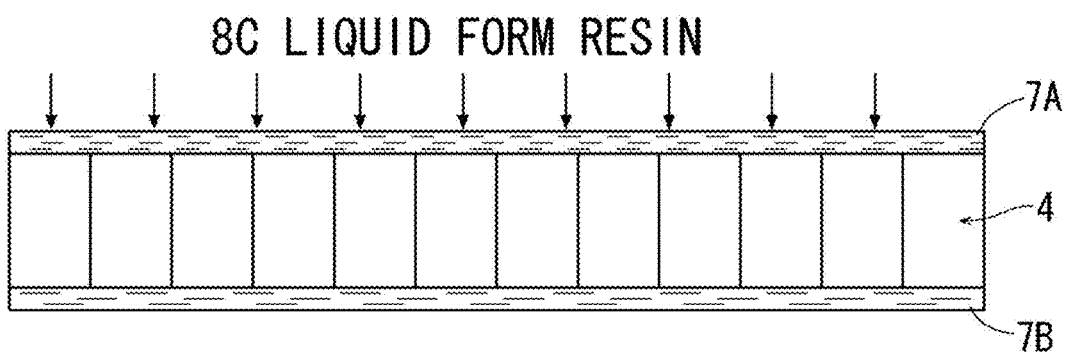
FIG. 15 is an explanatory view for schematically explaining a process of applying a liquid (uncured) foam resin to one of the fiber sheets in the third embodiment.

Subsequently, as shown in FIGS. 13 and 15, the liquid (uncured) foam resin 8C is applied (supplied) from the upper side to the one fiber sheet 7A located on the upper surface of the laminated body 10. This is to impregnate the one fiber sheet 7A with the liquid foam resin 8C so as to form the fiber reinforcement layer 3 on one side in the thickness direction of the paper honeycomb structure 4. When the foam resin 8C is contained in the fiber sheet 7A, a degree of adhesion of the foam resin 8C to the one fiber sheet 7A becomes high even before the foam resin 8C is cured, due to the density of the one fiber sheet 7A, the viscosity of the foam resin 8C, the entanglement between the foam resin 8C and the fibers of the one fiber sheet 7A, etc., so that the foam resin 8C does not flow downward through the one fiber sheet 7A. In this case, when the liquid foam resin 8C is applied to the one fiber sheet 7A, as in the first embodiment, the robot conveys the laminated body 10 described above to a resin applying device (spraying device) not shown while gripping the laminated body 10.

Figure 16:
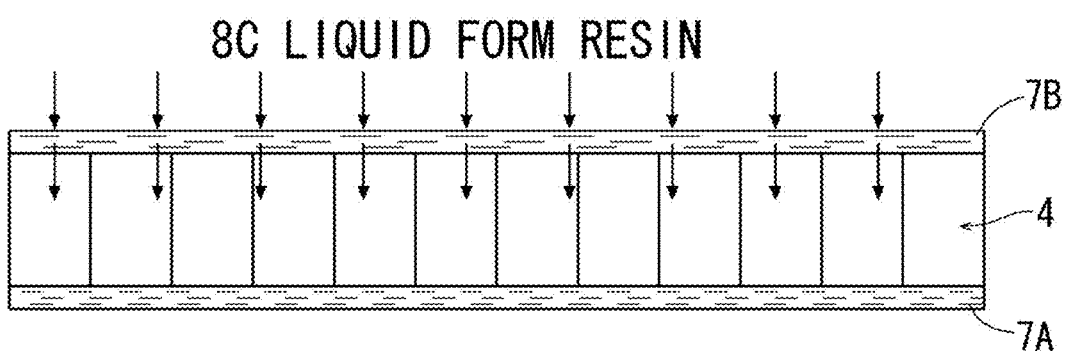
FIG. 16 is an explanatory view for schematically explaining a process of applying a liquid (uncured) foam resin to the other fiber sheet in the third embodiment.

When the application of the liquid foam resin 8C to the one fiber sheet 7A is completed, the laminated body 10 is inverted by a robot not shown to achieve a posture in which the other fiber sheet 7B is arranged above the one fiber sheet 7A (see FIG. 16). In this case, the liquid foam resin 8C contained in the one fiber sheet 7A has strongly adhered to the one fiber sheet 7A and therefore hardly drops.

After achieving the posture in which the other fiber sheet 7B is arranged above the one fiber sheet 7A, as shown in FIGS. 13 and 16, the liquid (uncured) foam resin 8C is applied (supplied) to the other fiber sheet 7B from the upper side. This is to supply the liquid foam resin 8C into the through-holes 5 of the paper honeycomb structure 4 by utilizing the permeability of the other fiber sheet 7B and to impregnate the other fiber sheet 7B with the resin. In this case, although the liquid foam resin 8C flows into the through-holes 5 of the paper honeycomb structure 4 through the other fiber sheet 7B, the one fiber sheet 7A arranged on the lower side of the other fiber sheet 7B prevents the liquid foam resin 8C from leaking to the outside based on the dense internal structure thereof and the foam resin 8C contained and adhering to the fiber sheet 7A, so that as the liquid foam resin 8C is applied (supplied) to the other fiber sheet 7B, the liquid foam resin 8C in the through-holes 5 increases to reach a state of being contained in the fiber sheet 7B. When the liquid foam resin 8C is contained in the fiber sheet 7B and reaches a predetermined state, the application (supply) of the liquid foam resin 8C to the other fiber sheet 7B is stopped.

When the process of applying the liquid foam resin 8C to the other fiber sheet 7B is completed, the robot carries the laminated body 10 having the liquid thermosetting resin applied thereto into the mold 11 as in the manufacturing method in the first embodiment, and the mold 11 heats and compresses the laminated body 10. As a result, the liquid foam resin is foamed and cured, and the through-holes 5 of the paper honeycomb structure 4 is entirely filled with the cured foam resin 6, and the fiber reinforcement layers 3 are formed on both sides in the thickness direction of the paper honeycomb structure 4. As a result, the laminated plate 1 is manufactured, and the manufactured laminated plate 1 is taken out from the mold 11 to terminate the manufacturing process.

Therefore, in this third embodiment, the same laminated plate 1 as the first embodiment can be manufactured. Moreover, since the liquid foam resin 8C retained in the through-holes 5 of the paper honeycomb structure 4 can be foamed and cured in this manufacturing method, it is not necessary to consider the relative relationship between the paper honeycomb structure 4 and the foam resin plate 6A, the performance of the foam resin plate 6A, etc., unlike the case of filling the foam resin plate 6A into the through-holes 5 as a filling material. Therefore, from this viewpoint, the manufacturing of the laminated plate 1 can be facilitated.

The fourth embodiment shown in FIGS. 19 and 20 shows a modification of the third embodiment. In this fourth embodiment, description will be made of the details of manufacturing the laminated plate 1 without inverting the laminated body 4 etc. by using the same constituent members as the third embodiment (the one fiber sheet 7A, the other fiber sheet 7B, the paper honeycomb structure 4, the liquid foam resin 8C, etc.).

In the fourth embodiment, when the laminated body 10 is formed, as shown in FIG. 19, a posture is achieved such that the other fiber sheet 7B higher than the one fiber sheet 7A in terms of the permeability for the liquid foam resin 8C is arranged above the one fiber sheet 7A. Obviously, also in this case, a robot (hand) is used for the laminating work of the lamination components 7A, 4, 7B as in the third embodiment, and the robot sequentially laminates the lamination components 7A, 4, 7B and grips the laminated lamination components 7A, 4, 7B.

Subsequently, as shown in FIG. 20, while the posture (the posture in which the other fiber sheet 7B is arranged above the one fiber sheet 7A) is maintained (without inversion), the liquid (uncured) foam resin 8C is applied (supplied) to the other fiber sheet 7B from the upper side. As a result, the liquid foam resin 8C is supplied into the through-holes 5 of the paper honeycomb structure 4 by utilizing the permeability of the other fiber sheet 7B and reaches the one fiber sheet 7A through the through-holes 5. Therefore, the one fiber sheet 7A is impregnated with the liquid foam resin 8C while suppressing leakage to the outside based on the dense internal structure, and furthermore, as the liquid foam resin 8C is contained in and adheres to the fiber sheet 7A, the resin and the fiber sheet 7A cooperate with each other to further suppress the leakage of the supplied liquid foam resin 8C to the outside.

When the liquid foam resin 8C is impregnated in the one fiber sheet 7A and the other fiber sheet 7B to a predetermined state, the application (supply) of the liquid foam resin 8C to the other fiber sheet 7B is stopped, and the robot carries the laminated body 10 having the liquid thermosetting resin applied thereto into the mold 11 as in the third embodiment. Subsequently, the mold 11 heats and compresses the laminated body 10 and, as a result, the laminated plate 1 is manufactured.

Therefore, in the manufacturing method according to the fourth embodiment, the laminated plate 1 can obviously be manufactured, and since the other fiber sheet 7B on the paper honeycomb structure 4 is maintained in the posture in which the other fiber sheet faces upward from the beginning, the necessity to change the posture (necessity for inversion) can be eliminated between the one fiber sheet 7A and the other fiber sheet 7B, so that a workload can be reduced.

Although the embodiments have been described above, the present invention includes the following forms.

(1) A foam resin plate made of a foam resin other than foamed polyurethane is used as the foam resin plate.

(2) A resin other than the urethane resin is used as the liquid foam resin 8C (8B).

(3) In the third embodiment, first, the one fiber sheet 7A is arranged on one side in the thickness direction of the paper honeycomb structure 4 to supply the liquid foam resin 8C to the one fiber sheet 7A, and the paper honeycomb structure 4 and the one fiber sheet 7A are then inverted so that the other fiber sheet 7B is arranged on the other side (the upward-facing side) in the thickness direction of the paper honeycomb structure 4 to supply the liquid foam resin 8C to the other fiber sheet 7B.

INDUSTRIAL APPLICABILITY

The present invention can be used to improve rigidity and sound absorption performance while suppressing an increase in weight as much as possible in providing the laminated plate 1 and can also be used to easily manufacture the laminated plate 1.

EXPLANATIONS OF LETTERS OR NUMERALS 1 laminated plate
2 core layer
3 fiber reinforcement layer
4 paper honeycomb structure (porous body)
5 through-hole
6 foam resin
6A foam resin plate
7 fiber sheet (fiber layer)
7A one fiber sheet (one fiber layer)
7B the other fiber sheet (other fiber layer)
8A cured thermosetting resin
8B uncured thermosetting resin
8C liquid (uncured) foam resin 10 laminated body
B boundary line

The invention claimed is:

1. A method of manufacturing a laminated plate with a honeycomb structure having multiple through-holes adjacent to each other, comprising:
   arranging fiber layers consisting only of fibers on both sides of the honeycomb structure in a thickness direction and interposing a foam resin plate between at least one of the fiber layers and the honeycomb structure, the foam resin plate being cured and having a lower compression strength than the compression strength of the honeycomb structure,
   supplying an uncured resin to each of the fiber layers from the outer side of each fiber layer, and
   compressing each of the fiber layers supplied with the uncured resin toward the honeycomb structure and curing the resin during the compressing to form fiber reinforcement on both sides of the honeycomb structure in the thickness direction, wherein a compression force used during the compressing pushes the foam resin plate into the through-holes of the honeycomb structure as a filling material.

2. The method according to claim 1, wherein
   a plurality of types of foam resin plates having a different degree of foaming are prepared for the foam resin plate, and wherein the process further comprises:
   selecting the foam resin plate from the plurality of types of foam resin plates at the time of manufacturing.

3. The method according to claim 1, wherein
   the honeycomb structure is a paper honeycomb structure made of a paper material.

4. The method according to claim 1, wherein
   the foam resin plate is a plate-shaped foamed polyurethane, and wherein
   the resin applied to the fiber layers is a polyurethane-forming mixture.

5. The method according to claim 4, wherein
   the honeycomb structure is a paper honeycomb structure made of a paper material.

6. The method according to claim 1, wherein
   the compression strength of the foam resin plate is equal to or greater than a predetermined compression strength smaller than the compression strength of the honeycomb structure and the foam resin plate has an elongation rate per unit thickness equal to or less than a predetermined value.

7. The method according to claim 6, further comprising:
   determining the predetermined value for the elongation rate per unit thickness by a process comprising:
   repeatedly inserting foam resin plate having a range of thicknesses and elongation rate;
   evaluating the performance of each of the inserted foam resin plates based on a desired performance metric; and
   determining a suitable range of thickness and elongation rate the produce the desired performance metric,
   whereby a boundary of the suitable range represents the predetermined value.

8. The method according to claim 6, wherein
   a plurality of types of foam resin plates having a different degree of foaming are prepared for the foam resin plate, and wherein the process further comprises:
   selecting the foam resin plate from the plurality of types of foam resin plates at the time of manufacturing.

9. The method according to claim 6, wherein
   the foam resin plate is a plate-shaped foamed polyurethane, and wherein
   the resin applied to the fiber layers is a polyurethane-forming mixture.

10. The method according to claim 6, wherein
    the honeycomb structure is a paper honeycomb structure made of a paper material.

* * * * *